United States Patent Office 3,351,764
Patented Nov. 7, 1967

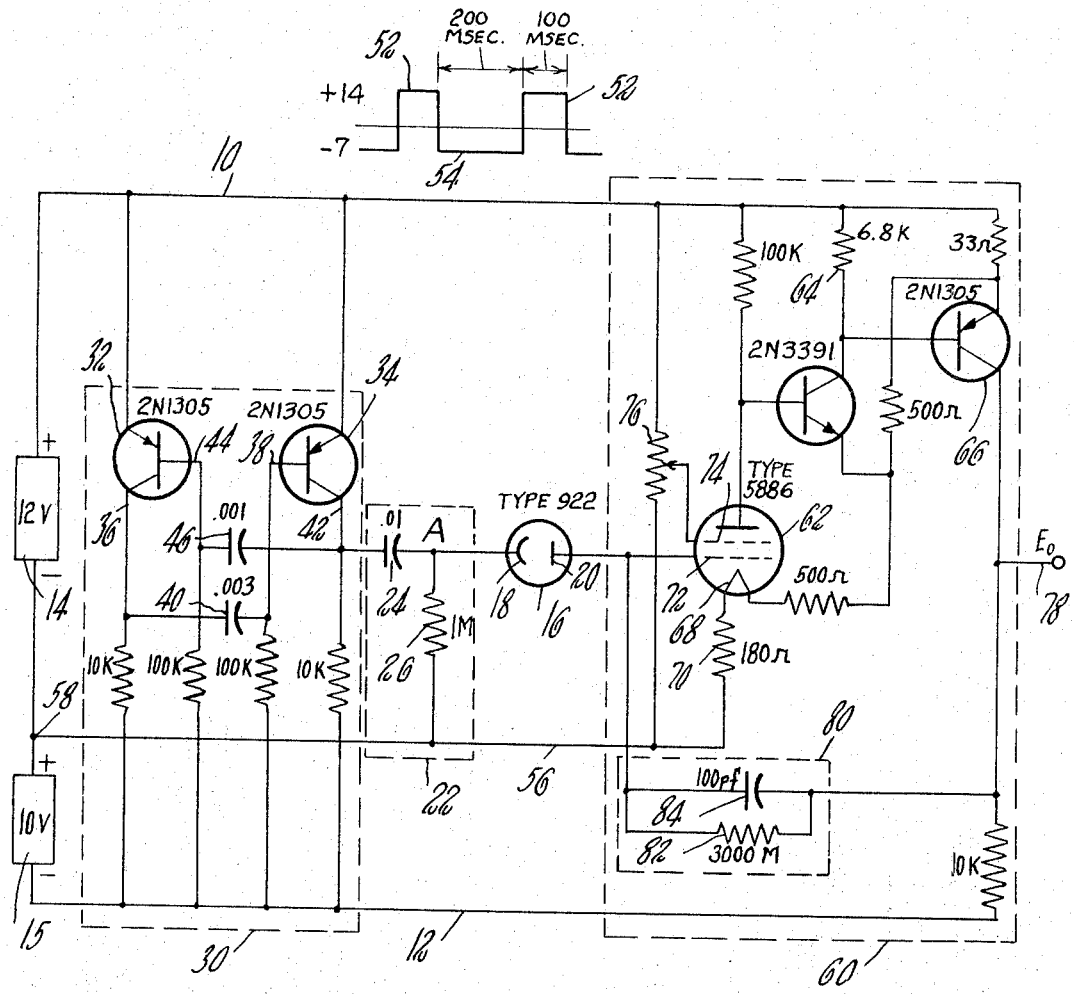

1

3,351,764
CIRCUIT FOR BALANCING OUT NOISE CURRENT IN A PHOTODIODE USING A D-C ZERO AVERAGE WAVEFORM
David E. Blackmer, Weston, Mass., assignor to Instrumentation Laboratory Inc., a corporation of Massachusetts
Filed June 4, 1965, Ser. No. 461,267
10 Claims. (Cl. 250—214)

This invention relates to electric circuits and, more particularly, to such circuits that are arranged for measuring radiation flux.

It is frequently desired to measure radiation flux at levels of small magnitude, for example, in connection with flame photometry. In such an application, it is desired to measure an intensity of light radiation having principal components in the red portion of the spectrum (in the range of 7,000 to 11,000 Angstroms). A sensor suitable for this purpose utilizes electrode elements of material that have photoelectric work function characteristics so that electrons are emitted from the electrode material in response to light flux impinging on the electrodes. Such electrode material, however, is also a good thermal electron emitter and, therefore, in such devices, a significant contribution to the dark current is made by thermal electron emission. Other sources of dark current are leakage current between electrodes and current due to electrons and ion pairs generated by ionizing radiation. The device conventionally utilized for measuring low light levels in such applications is a photomultiplier tube employing an S1 photocathode. An electric circuit incorporating such a device for measuring light flux is expensive and nonetheless the dark current makes it difficult to measure low levels of radiation flux.

It is the object of this invention to provide a novel and improved radiation flux sensing circuit.

Another object of the invention is to provide a novel and improved flux sensing circuit particularly arranged for sensing the flux densities of low levels in the red portion of the radiation spectrum.

Another object of the invention is to provide novel and improved electric circuits for measuring radiation flux that are less expensive to manufacture than the circuitry heretofore utilized for similar applications.

Still another object of the invention is to provide novel and improved radiation flux sensor having an improved signal to noise ratio.

In accordance with the invention, there is provided an electric circuit for translating radiation flux into an electric signal comprising a transducer having an electrode of low photoelectric work function material so that when it is exposed to radiation flux, an electric current is produced in the transducer which is proportional to the radiation flux to which the transducer element is exposed. The circuit also includes means to maintain a zero average DC potential across the transducer. In the particular embodiment described hereinafter in detail, there is provided means to generate a square wave signal that has alternating positive and negative portions. This square wave signal is applied to the transducer in a manner so that the product of electric potential with respect to a reference potential and time duration of the positive portion of the square wave signal is equal to the product

2 of the electric potential with respect to that reference and time duration of the negative portion of the signal. Preferably, the time duration of one of the portions is substantially greater than the time duration of the other portion, and the circuit is arranged so that the square wave signal is applied to the transducer in a manner so that the transducer is conditioned for response to the radiation flux during the application of the portion of greater time duration to the transducer. Connected to the other terminal of the transducer is a DC current amplifier having an input and an output, and a feedback circuit connected between the output of the amplifier and its input for maintaining an average electric potential condition equal to the reference potential at the input of the amplifier.

A radiation flux measuring circuit constructed in accordance with the invention has a sensitivity in excess of an order of magnitude better than the sensitivity of a corresponding type of measuring circuit that employs a photomultiplier tube and this circuit may be manufactured at a cost which is substantially less than the cost of circuitry employing the photomultiplier. Other objects, features and advantages of the invention will be seen as the following description of a particular embodiment progresses, in conjunction with the drawing in which the single figure thereof illustrates a schematic diagram of a light measuring circuit particularly adapted for use in connection with flame photometry apparatus.

The circuitry indicated in the drawing has a positive bus 10 and a negative bus 12 across which are connected to two DC sources 14, 15. The circuit includes a transducer 16 in the form of a vacuum photodiode that has a cathode (input) element 18 and an anode (output) element 20. The material of cathode 18, a silver-cesiumoxide (AgOCs), has a low photoelectric work function. Connected to the cathode element is a differentiator circuit 22 which includes capacitor 24 and resistor 26.

Connected between the input of differentiator circuit 22 and source 14 is a multivibrator circuit 30 that includes two transistors 32, 34, the collector electrode 36 of transistor 32 being connected to the base electrode 38 by means of coupling capacitor 40 and the collector electrode 42 of transistor 34 being connected to the base electrode 44 of transistor 32 by means of capacitor 46.

This circuit combination of multivibrator and differentiator applies to cathode 18 of photodiode transducer 16 (at point A), a square wave of the form indicated in the figure, the square wave signal having positive portions 52 and negative portions 54. It will be noted that the duration of the negative portion 54 is twice the duration of the positive portion 52. This square wave output from the multivibrator 30 is referenced to reference bus 56 (connected to the junction 58 between sources 14 and 15) by differentiator 22 so that the product of the electric potential and time duration of positive portion 52 is equal to the product of the electric potential and time duration of negative portion 54 with respect to that reference.

Connected to the anode 20 of the photodiode transducer 16 is a DC current amplifier 60 which employs an electrometer tube 62 and two stages of amplification that employ transistors 64 and 66 respectively. A positive bias in the order of 1.8 volts is applied to the filament 68 of electrometer tube 62 by means of resistor 70 of the resistive voltage divider network connected between positive bus 10 and reference conductor 56. The output from the current amplifier is at terminal 78 while the input to current amplifier is the grid 72 of the electrometer tube 62. The screen grid 74 of electrometer tube 62 is connected to potentiometer 76 to provide a conventional electrometer zero adjust control.

Connected between the amplifier output and input is a DC feedback circuit 80 which includes a resistor 82 and capacitor 84 connected in parallel. Capacitor 84 functions as an integrator to average the feedback current. (It will be noted that the feedback circuit has a time constant substantially greater than the cycle duration of the applied square wave signal applied at the input of transducer 16). This circuitry is an operational amplifier of the the current feedback type having an open loop gain in excess of 1,000 so that the input terminal (grid 72) of the amplifier is maintained substantially at zero potential (the reference potential of line 56).

Transducer 16 is an asymmetrically conductive device which conducts only when its cathode 18 is at a negative potential with respect to its anode 20 and the conductive characteristics in that mode are directly proportional to light intensity provided the DC potential applied during that mode remains constant. The current flow, when transducer 16 is operating in conductive mode is directly proportional to the light intensity to which the photo cathode 18 is exposed. This photo electric conduction characteristic, however, is asymmetric, as it occurs only during the negative portions 54 of the applied square wave signal. The components of dark current (noise) in this transducer are principally; electric current due to leakage between cathode 18 and anode 20 through and along the surfaces of its glass envelope; electric current due to thermal electron emission; and electron current due to electrons and ion pairs generated by ionizing radiation. These three currents are substantially symmetrcial with respect to the polarity and magnitude of the applied potential.

As the differentiator 22 accurately relates the applied potential to a reference and the feedback current amplifier maintains the output potential of the transducer 16 (averaged by capacitor 84) at substantially the reference potential, no appreciable offset in the output potential results and the output signal to be amplified by DC amplifier 60 is substantially exclusively a function of the radiation flux density sensed by transducer 16. Circuitry constructed in accordance with the invention employing as a transducer a Type 922 photocell (manufactured, for example, by General Electric or RCA) exhibits a dark current of magnitude equivalent to a light flux of $10^{-7}$ lumens.

While a particular embodiment of the invention has been shown and described, various modifications thereof will be apparent to those skilled in the art and, therefore, it is not intended that the invention be limited to the disclosed embodiment or to details thereof and departures may be made therefrom within the spirit and scope of the invention as defined in the claims.

What is claimed is:

1. An electric circuit for translating radiation flux into an electrical signal comprising
   a photodiode having a radiation responsive electrode element, and an input terminal and an output terminal,
   means for applying an alternating signal to the input terminal of said photodiode,
   a DC current amplifier connected to the output terminal of said photodiode,
   and means for maintaining a zero average DC electric potential between the input and output terminals of said photodiode.

2. The circuit as claimed in claim 1 wherein said means for maintaining a zero average potential includes a feedback circuit connected between the output and input terminals of said current amplifier.

3. The circuit as claimed in claim 2 and further including a resistance-capacitance differentiating circuit connected between said alternating signal generating means and said photodiode and wherein said feedback circuit includes an electrical resistance much larger than the resistance in said differentiator circuit.

4. The circuit as claimed in claim 1 wherein said means for maintaings a zero average potential includes a differentiator circuit connected between said alternating signal applying means and the input terminal of said photodiode.

5. An electric circuit for translating radiation flux into an electric signal comprising,
   a photodiode having an electrode of photoemissive material for producing an output electric current as a function of radiation flux impinging on said electrode,
   means to generate an alternating signal having a positive portion and a negative portion in each cycle,
   the product of the electric potential with respect to a reference potential and time duration of said positive portion being equal to the product of the electric potential with respect to said reference potential and time duration of said negative portion,
   circuit means for applying said alternating signal to said photodiode for conditioning said photodiode for conduction during application of one portion thereto,
   a DC current amplifier having an input and an output, said input being connected to the output of said photodiode for amplifying the current flow from said photodiode,
   and a feedback circuit connected between said amplifier output and said amplifier input for maintaining the average electric potential at said amplifier input equal to said reference potential.

6. The circuitry as claimed in claim 5 wherein the time constant of said feedback circuit is substantially greater than the cycle duration of the alternating signal applied to said photodiode.

7. The circuitry as claimed in claim 5 and further including a resistance-capacitance differentiating circuit connected between said alternating signal generating means and said photodiode and wherein said feedback circuit includes an electrical resistance much larger than the resistance in said differentiator circuit.

8. An electric circuit for translating radiation flux into an electric signal comprising,
   an asymmetrically conducting photodiode having a cathode electrode and an anode electrode spaced from said cathode electrode,
   means to generate an alternating signal having a positive portion and a negative portion in each cycle,
   the product of the electric potential with respect to a reference potential and time duration of said positive portion being equal to the product of the electric potential with respect to said reference potential and time duration of said negative portion,
   circuit means for applying said alternating signal to one electrode of said photodiode for conditioning said photodiode for conduction during application of one portion thereto,
   a DC current amplifier having an input and an output, said input being connected to the other electrode of said photodiode for amplifying the current flow through said photodiode,
   and a feedback circuit connected between said amplifier output and said amplifier input for maintaining the average electric potential at said amplifier input equal to said reference potential.

9. The circuitry as claimed in claim 8 and further including a resistance-capacitance differentiating circuit connected between said alternating signal generating means and said photodiode and wherein said feedback circuit includes an electrical resistance much larger than the resistance in said differentiator circuit.

10. The circuitry as claimed in claim 9 wherein the time constant of said feedback circuit is substantially greater than the cycle duration of the alternating signal applied to said transducer.

References Cited

UNITED STATES PATENTS

| | | | |
|---|---|---|---|
| 3,209,153 | 9/1965 | Frank | 250—207 |
| 3,222,980 | 12/1965 | Kalmus | 250—207 |
| 3,251,998 | 5/1966 | Britton et al. | 250—207 |

OTHER REFERENCES

Photo-electric Multipliers, by S. Rodda, 1953, MacDonald and Co., London (pp. 115–116).

RALPH G. NILSON, *Primary Examiner.*

M. ABRAMSON, *Assistant Examiner.*